United States Patent [19]

Lebost

[11] 4,234,289
[45] Nov. 18, 1980

[54] FLUID TURBINE

[76] Inventor: Barry A. Lebost, 1116 Warburton Ave., #1K, Yonkers, N.Y. 10701

[21] Appl. No.: 939,264

[22] Filed: Sep. 5, 1978

[51] Int. Cl.³ .............................................. F03D 1/04
[52] U.S. Cl. ................................. 415/2 R; 416/197 A
[58] Field of Search ........................................ 415/2-4; 416/197 A

[56] References Cited

U.S. PATENT DOCUMENTS

| 7,470 | 3/1833 | Deming | 415/4 |
|---|---|---|---|
| 767,080 | 8/1904 | Phillips | 415/2 |
| 1,169,223 | 1/1916 | Abern | 415/2 A |
| 1,652,022 | 12/1927 | Lemke | 415/164 |
| 1,963,196 | 6/1934 | Frisch | 415/2 R X |
| 3,930,750 | 1/1976 | Schultz | 416/197 A |
| 4,036,916 | 7/1977 | Agsten | 415/2 A |
| 4,057,270 | 11/1977 | Lebost | 415/2 A X |
| 4,116,581 | 9/1978 | Bolie | 415/2 A |

FOREIGN PATENT DOCUMENTS

| 2545951 | 4/1976 | Fed. Rep. of Germany | 415/2 A |
|---|---|---|---|
| 23839 | 12/1921 | France | 415/2 R |
| 789837 | 11/1935 | France | 415/3 |
| 1064500 | 5/1954 | France | 416/197 A |
| 2289767 | 5/1976 | France | 415/2 R |
| 2308803 | 11/1976 | France | 416/197 A |

*Primary Examiner*—Everette A. Powell, Jr.
*Attorney, Agent, or Firm*—Thomas K. Ziegler

[57] ABSTRACT

A fluid turbine designed for increased power output includes an annular housing provided with a semi-spherical dome for directing incoming fluid flow to impinge on a plurality of rotor blades within the housing fixed to a vertical output shaft. An angle on the order of between 5°-85°, in the direction of rotation of the shaft, exists between the upper (leading) and lower (trailing) edges of each blade. The blades are manufactured from a plurality of aerodynamically-shaped, radially spaced ribs covered with a skin. The leading edge of each rib is curved, while the trailing edge is straight. The straight edge of the ribs in each blade approach a vertical plane through the vertical axis of the housing output shaft as the ribs progress radially inwardly towards the output shaft. The housing has fluid exit passages in its base so that deenergized fluid can be quickly flushed from the housing by the downwardly directed flow in combination with the novel blade configuration, which acts as a screw or force multiplier, to expel deenergized fluid. The airfoil shaped ribs also provide the blades with a contour for increasing the fluid velocity on the underside of the blades adjacent the fluid exit passage to aid in expelling the deenergized air while providing the turbine with both impulse and axial-flow, fluid impingement on the blades, resulting in a force vector of increased magnitude.

A downwardly directed, substantially semi-cylindrical deflector frame connected to the housing blocks the path of flow of ambient fluid to create a low pressure area beneath the base to aid in continuously drawing fluid into the housing at high velocity to impinge on the rotor blades.

The increased flow velocity and force on the blades along with the enhanced removal of deenergized fluid results in increased power output of the turbine.

16 Claims, 8 Drawing Figures

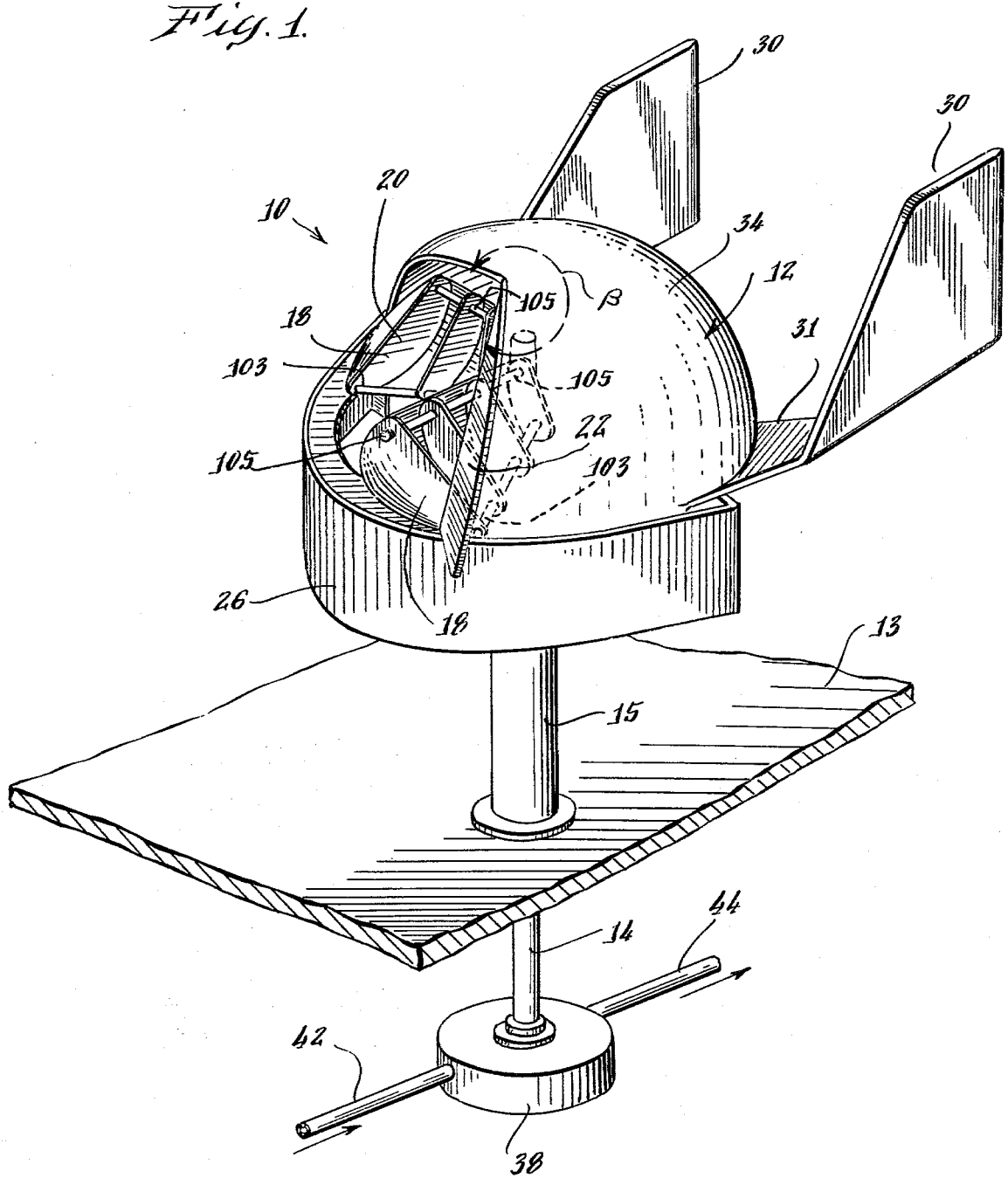

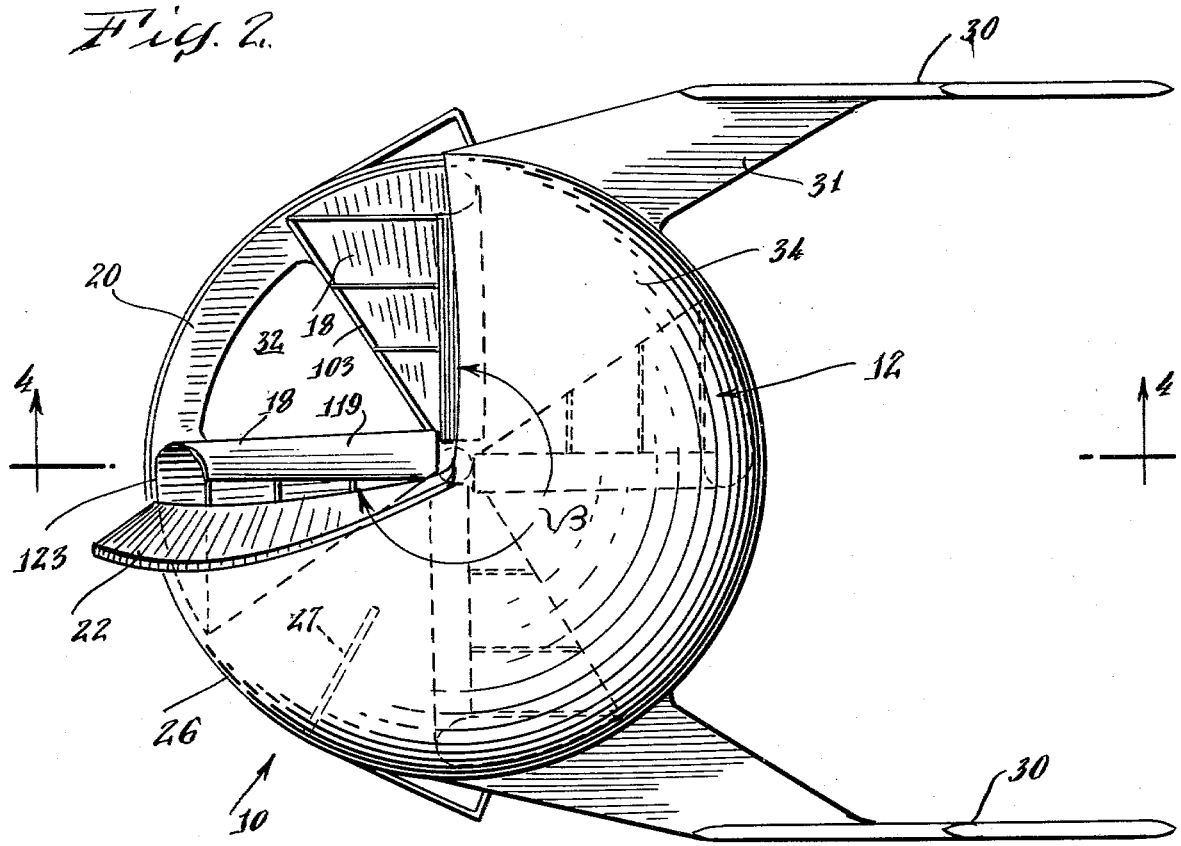
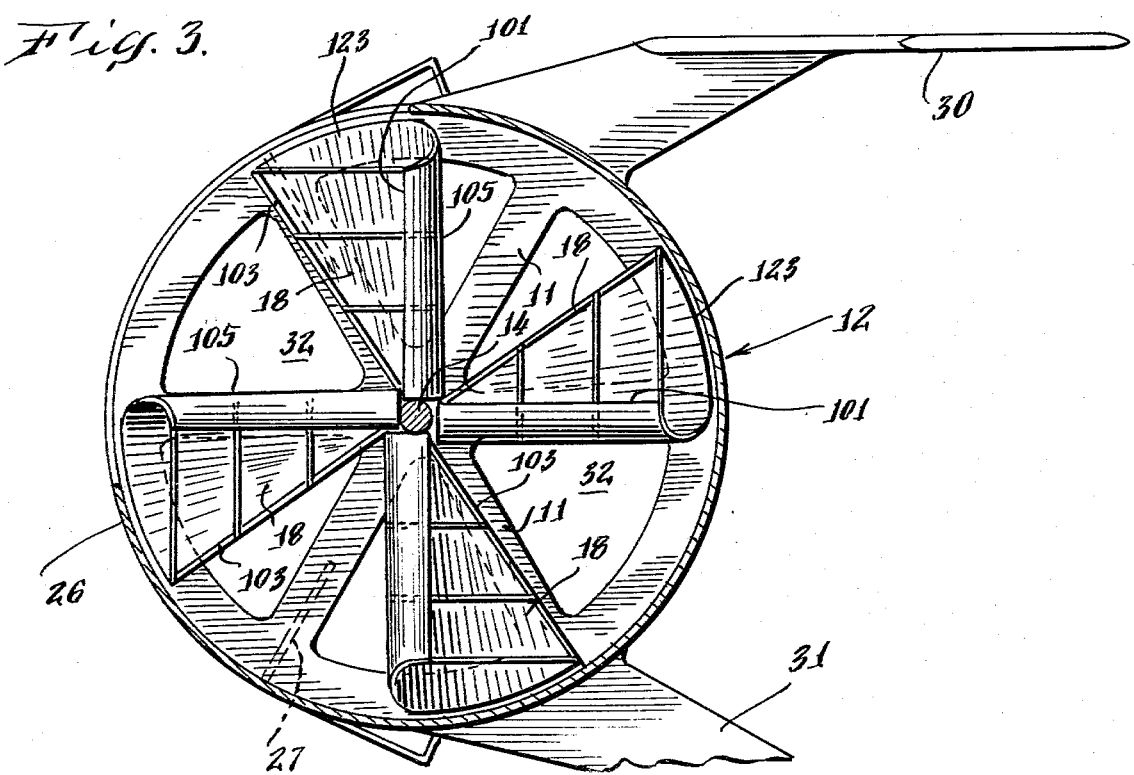

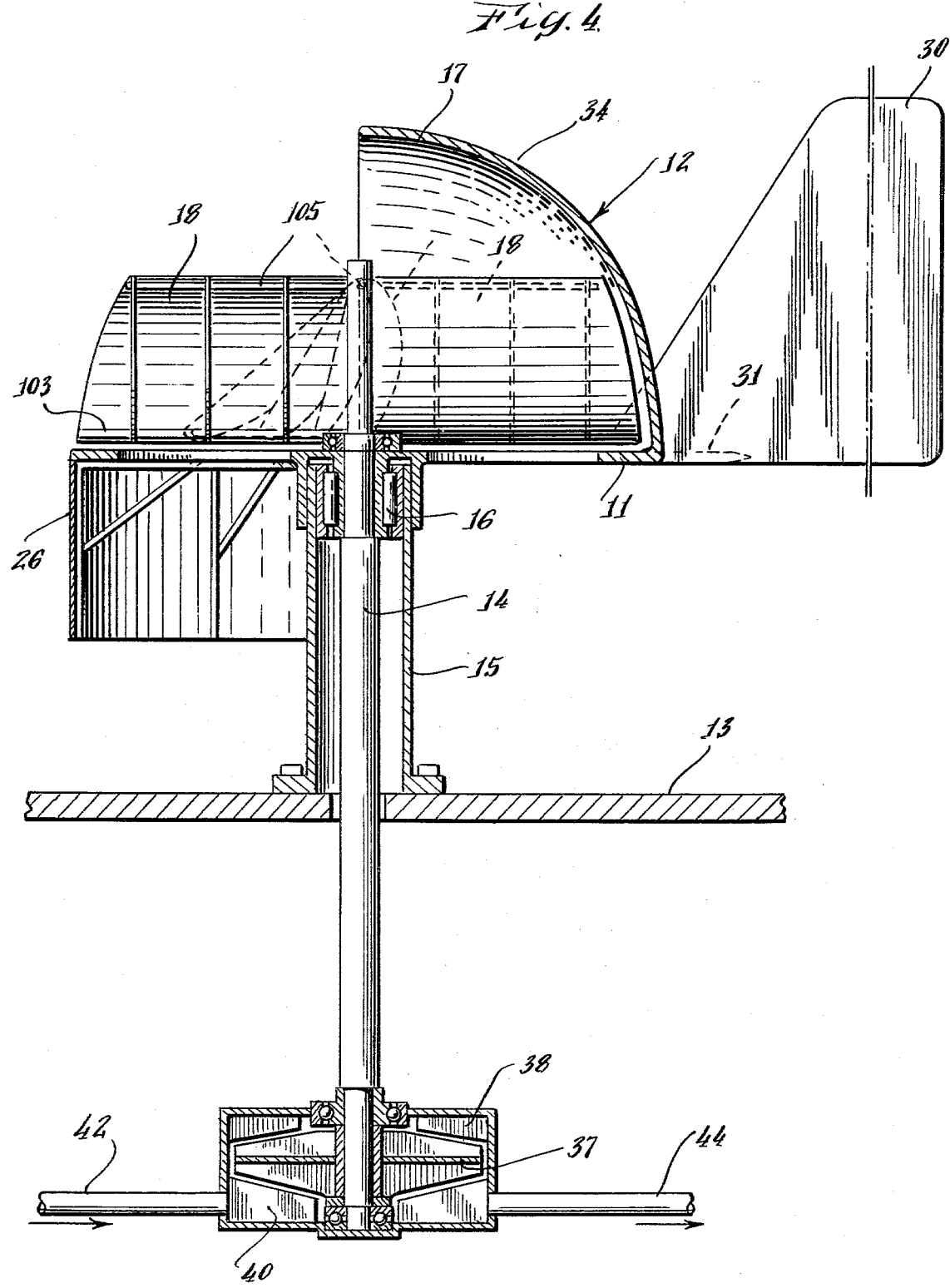

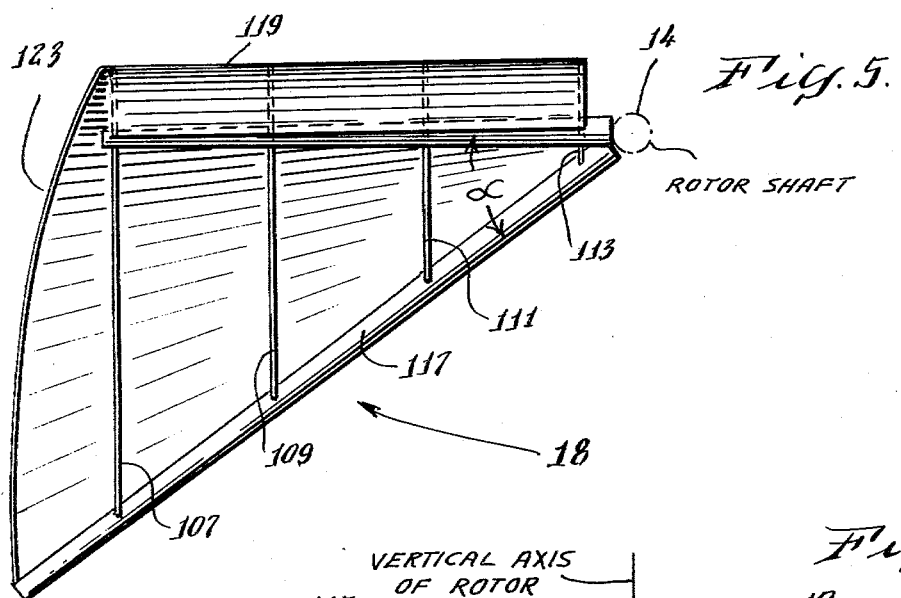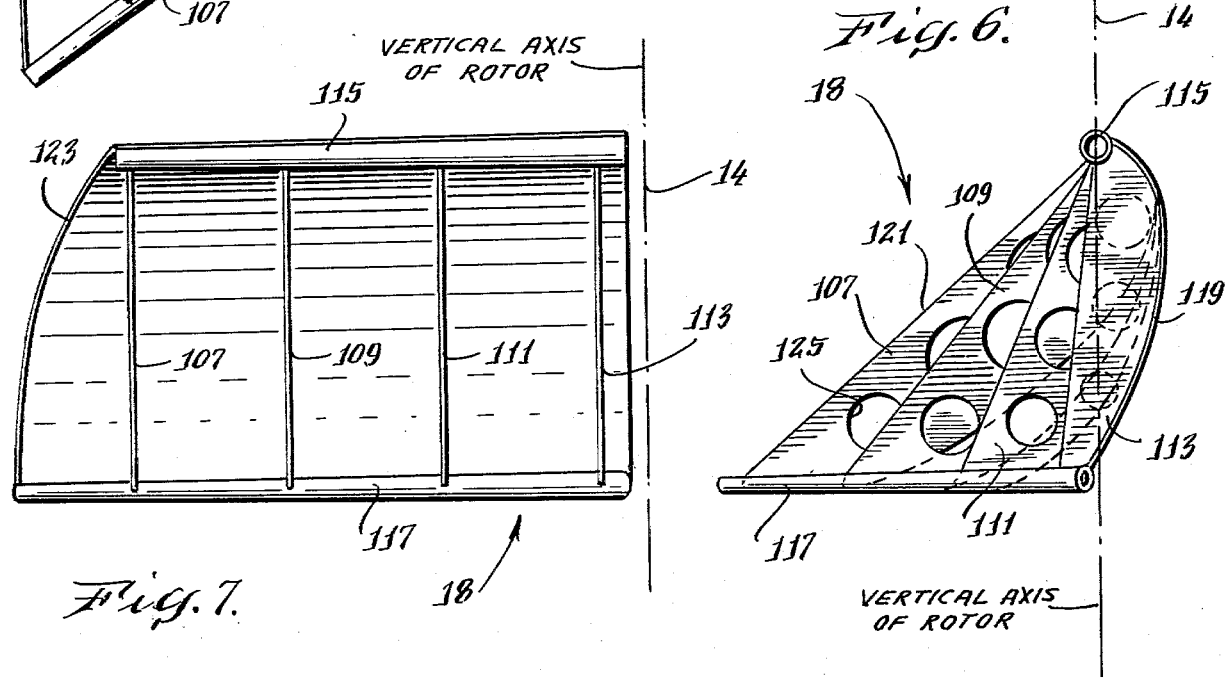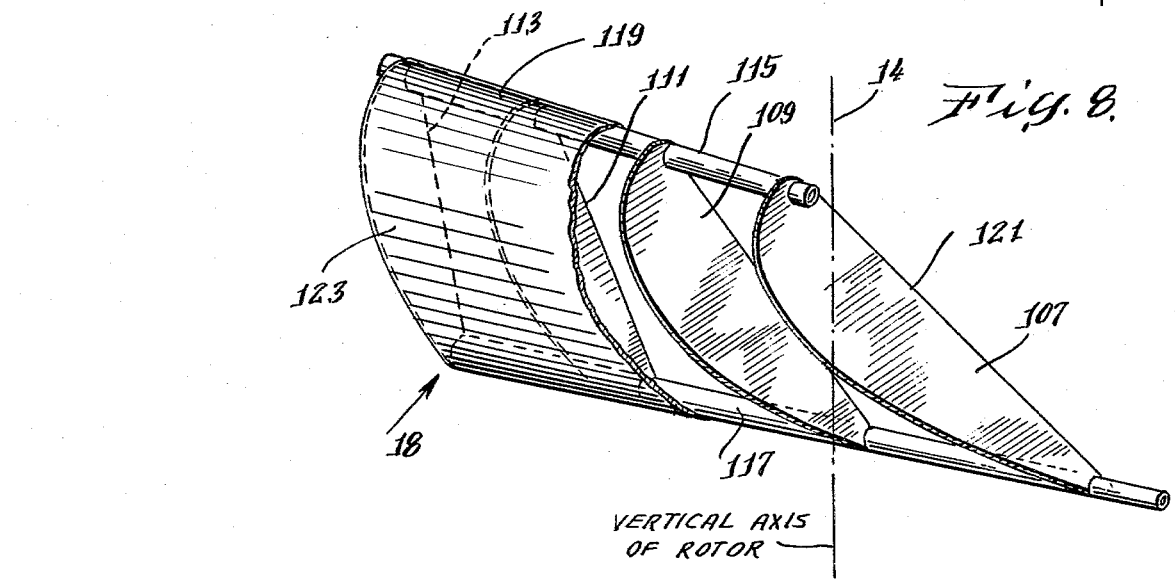

FLUID TURBINE

BACKGROUND OF THE INVENTION

1. Field of the Invention

This invention relates to a fluid turbine structure which is used to generate power by exposure to wind, tidal or ocean currents.

2. Description of the Prior Art

With sources of energy, such as petroleum, natural gas and the like, being rapidly depleted throughout the world, either new sources of such energy must be found or alternative sources must be developed to fulfill the energy requirements for a highly technical society. Natural, non-polluting, inexhaustible sources of energy, such as the wind, the tides, and the ocean currents can fulfill these needs.

Many attempts have been made heretofore to convert kinetic energy in ambient wind fields or tidal currents into shaft rotational energy in either horizontal or vertical axis machines to generate power for diverse purposes. Typically, the horizontal axis machines are of the propeller type which have existed for centuries in various forms. A major drawback of the horizontal axis type machine is that the plane of blade rotation must constantly change as the wind changes direction. This is usually accomplished in practice by affixing a "tail" or vertical stabilizer to the rear of the rotor and allowing the rotational axis to pivot into the wind. This introduces undesirable gyroscopic loads and a design constraint in that the response of the machine to changes in wind direction must be sufficiently rapid to track and capture the available kinetic energy. Furthermore, the operation of such machines is highly inefficient.

For example, U.S. Pat. Nos. 2,153,523 and 2,177,801, each illustrate a horizontal axis machine which uses wind driven double impellers for simultaneously rotating the field and armature windings of an electrical generator in opposite directions to double power production. The windings of the generator are connected to coaxial shafts which are driven in opposite or counter rotation by oppositely curved wind impellers. The impellers have opposite curvatures so as to turn in opposite directions when positioned normal to the direction of the wind by a vane, "tail", or vertical stabilizer.

Twin impeller wind machines of this type have been able to provide more electrical power because of their inherent design. However, in the construction of horizontal, twin impeller wind machines, one impeller has always been placed behind the other in parallel, vertical planes. Accordingly, both impellers must get their energy from the same wind field while rotating in opposite directions causing undesirable gyroscopic forces on the machine, while causing drag of one impeller relative to the other slowing the tip velocity of the impellers and thereby creating inefficient power production. As previously stated, such a design also requires that the impellers be placed in a plane which is constantly changing as the wind direction changes and therefore must be rapid in response to changes in wind direction under the urging of the "tail" or vane.

Accordingly, in recent years, a number of vertical axis machines have been investigated as an alternative source of converting kinetic energy in ambient wind fields and tidal currents into shaft rotational energy. These include the Savonius, Darrieus and Gyromill configurations in which the impellers have taken the form of exposed air foils, sails, and paddles. Many of these rotor structures are inefficient because when they rotate away from the fluid source, they also must return to their starting point and therefore, must cut back into the source of fluid, which tends to retard their rotation, leading to inefficient power production.

Since the state of the art has not been satisfactory, other innovative approaches have recently been proposed. One approach has been to generate a vortical flow by introducing appropriate non-rotating structures in the flow and to attempt to capture some of the associated wind pressure energy in addition to the conversion of the ambient kinetic energy. Sforza, for example, has placed the rotational axis of a propeller type windmill coaxially with the core of a vortex generated by a delta wing at incidence to the wind, so that the turbine ingests the angular kinetic energy of the upstream vortex. Yen has investigated an alternate mode of vortex augmentation in which a confined vortex is generated in a tower, and a low-pressure core is used as a pump for a propeller type turbine flow to discharge into.

It will be appreciated from the foregoing discussion that fluid powered turbines have mainly been machines placed in fluid currents to rotate from the direct force of that current as it moves past a rotor or impeller that is connected to a power generator. Little has been done in the way of molding, shaping, directing, or increasing the velocity of the incoming fluid upon the rotor arrangement. In theory, the power available from a fluid current is proportional to the cube of the fluid current velocity. Therefore, the most powerful fluid driven machine would be one in which means are provided to increase the velocity of the arriving fluid and which is designed for maximum efficiency.

This suggests the desirability of a fluid energy machine incorporating the advantages of a vertical axis and flow-focusing housing or shroud. Ideally, only the housing would have to pivot to present the inlet to the oncoming fluid flow, thus eliminating any gyroscopic loads, as in horizontal axis machines, and greatly mitigating the problem of rapid response to wind directions shifts since the outer housing and tail could be constructed of lightweight materials and rotate relative to the rotor.

Such a device was described in detail in my prior U.S. Pat. No. 4,057,270, issued Nov. 8, 1977. The fluid turbine disclosed in that patent is characterized by increased power output and efficiency and is accomplished by providing upper and lower twin rotors which are spaced in parallel, horizontal planes so as to be subject to separate wind fields or fluid currents and, therefore, subject to independent operation. The rotor or impeller blades are not forced to cut back into the wind or fluid current as in the prior art devices, but rather the vector force of the fluid impinging on the blades and the vector force imparted by new fluid entering the rotor are complementary.

Two substantially annular, rotor housings are each provided with a plurality of radially extending blades connected to coaxial shafts. One of the shafts is connected to the field windings of an electrical generator, while the other shaft is connected to the armature windings. The radial blades in each rotor housing, when exposed to a fluid force, are adapted to rotate in opposite or counterdirections causing the field and armature windings of the generator to rotate in opposite directions to increase the power output from the generator.

A tail vane and "lazy susan" bearing connected to each housing provides means for keeping the machine pointed normal to or into the oncoming fluid. The housings rotate relative to the rotor blades thereby enabling the blades to rapidly respond to wind direction shifts.

Properly curved stator blades adjacent to the entrance to each rotor housing form a series of fluid jets which provide acceleration to the oncoming fluid and a means for directing that fluid in a manner normal to the path of rotation of the rotor blades. This has the effect of increasing the starting torque on the radial rotor blades about the annular housing of each opposite rotating rotor and once operation is commenced, to increase the available effective force of the incoming fluid current.

Directing fluid to the stator blades are two fluid scoops at 45 degree angles to the housings. The scoops placed in this manner increase the velocity of the fluid entering the entrance to each housing and stator apertures and results in increasing the force delivered upon each blade on both rotors which increases the velocity of both rotors in opposite directions and thus multiplies the power output by an extremely significant amount. New fluid passing through the stator jets formed by the stator blades will tend to recycle this fluid, changing its direction and thus adding to the force of the fluid already in the rotor housing. This increases the rotor torque. The stator jets bend the fluid from its normal position to a position aiding the internal fluid and applying pressure against the rotor blades making this internal fluid compatible with new fluid entering the housing to eliminate turbulence.

Tunnels are also mounted on the top of each rotor housing to deliver fluid to the interior of the housing and create a lower pressure area inside each housing to increase the velocity of the fluid within the housing and the pressure on the rotor blades. By use of the arrangement described, power output is available even in light fluid currents or winds, and in heavy currents power output is greatly multiplied.

While my prior device generated effective power, I discovered that at least the same amount of power could be generated in relatively light winds and at relatively low rotor tip velocities by the use of a single rotor structure and housing which is designed to further augment the fluid velocity impinging upon the rotor blades. The improved apparatus is disclosed in my co-pending application Ser. No. 876,217, filed Feb. 9, 1978.

That apparatus includes an additional fluid pathway into the rotor housing for directing fluid flow from a fluid source in such a way that incoming fluid impinges upon all of the rotor blades simultaneously at start up and during rotation. By enabling the fluid flow to impinge simultaneously on all of the rotor blades, the kinetic energy initially lost in starting the rotor moving is captured and used. Moreover, greater turning torque is established after rotation has commenced.

This increased efficiency is obtained while providing a housing surrounding the rotor blades which is independently rotatable relative to the rotor, thereby quickly enabling the rotor to face the oncoming fluid regardless of direction. The housing is designed to preclude the rotor blades from turning back into the resistance of the oncoming fluid.

Additional velocity augmentation devices are provided on the housing, including a downwardly directed frontal scoop which accelerates the ambient flow as it enters the housing as well as creating a low pressure area beneath the housing by blocking the flow. This low pressure area in conjunction with reflected flow provided in the housing can flush deenergized fluid from between the rotor blades out of the housing through fluid exit passages formed in the base of the housing to draw more fluid into the housing to impinge on the rotor blades.

The net-effect of such a structure is to increase both efficiency and power output enabling a single rotor (and therefore considerably less material) to furnish the same or better power than had heretofore been realized in my counter-rotating, double rotor machine, which is of critical importance in the field. For example, the unique flow focussing structure increases the power and efficiency of the rotor above the ideal efficiency (Betz limit) of unshrouded propeller type windmills. This efficiency as produced by the above-described turbine at extremely low rotor tip velocities; specifically, by comparison—at one-tenth the rotor tip velocity of the vertical Darrieus rotor with a simultaneous result of doubling the power output. This enables the turbine to achieve a higher exponential rate of power in high winds, than has ever been achieved heretofore, with low maintenance due to low centrifugal forces and bearing wear.

SUMMARY OF THE INVENTION

The present invention is an improvement upon the structure described immediately above.

The improved structure includes a housing with a fluid entrance passage and a plurality of rotor blades mounted on a shaft within the housing for rotation about the longitudinal axis of the shaft. Each of the blades has an upper edge which leads the lower edge in the direction of rotation. The housing can be independently rotated about an axis common with the axis of the shaft to position the fluid entrance passage in said housing normal to the direction of fluid flow.

The blade structure presents a greater surface to incoming and downwardly directed fluid to provide a substantial increase in shaft output power. An angle on the order of between 5°-85°, in the direction of rotation of the shaft, exists between the upper (leading) and lower (trailing) edges of each blade. The blades are manufactured from a plurality of aerodynamically shaped (airfoil), radially spaced, ribs which are covered with a skin on the leading edge side. The leading edge of each rib is curved, while the trailing edge is straight. The straight edge of the ribs in each blade approach a vertical plane through the vertical axis of the housing output shaft as the ribs progress radially inwardly towards the output shaft.

The housing has fluid exit passages in its base so that deenergized fluid can be quickly flushed from the housing by the downwardly directed flow in combination with the novel blade configuration, which acts as a screw or force multiplier, to expel deenergized fluid. The airfoil shaped ribs also provide the blades with a contour for increasing the fluid velocity on the underside of the blades adjacent the fluid exit passage to aid in expelling the deenergized air and provides the turbine with both impulse and axial flow fluid impingement on the blades providing a resultant force vector of increased magnitude on the rotor blades.

A downwardly directed substantially semi-cylindrical deflector frame connected to the housing blocks the path of flow of the ambient fluid to additionally create a low pressure area beneath the base to aid in continuously drawing fluid into the housing at high velocity to impinge on the rotor blades. The increased flow velocity and force on the blades along with the enhanced removal of deenergized fluid results in increased power output of the turbine.

BRIEF DESCRIPTION OF THE DRAWINGS

Further objects and advantages of the invention will become apparent from the following description and claims, and from the accompanying drawings, wherein:

FIG. 1 is a perspective view of the fluid turbine comprising the subject matter of the present invention;

FIG. 2 is a top plan view of the fluid turbine of FIG. 1;

FIG. 3 is a view similar to FIG. 2, but broken away to illustrate the interior components of the fluid turbine of FIG. 1;

FIG. 4 is a cross sectional view taken substantially along the plane indicated by lines 4—4 of FIG. 2;

FIG. 5 is a top plan view of one of the rotor blades of the turbine of FIG. 1;

FIG. 6 is a side view in elevation of the rotor blade of FIG. 5, as seen from the right hand side of FIG. 5;

FIG. 7 is a front view in elevation of the rotor blade of FIGS. 5 and 6; and

FIG. 8 is a rear perspective view of the rotor blade of FIGS. 5, 6 and 7 with portions cut away for purposes of illustration.

DETAILED DESCRIPTION OF THE PREFERRED EMBODIMENT

Referring now to the drawings in detail, wherein like numerals indicate like elements throughout the several views, the fluid turbine of the present invention is generally indicated by the numeral 10.

Fluid turbine 10 includes a substantially annular, horizontal rotor housing 12. The base of rotor housing 12 includes a plurality of support arms 11, which are rotatably mounted by a bearing structure 16 on a substantially vertical shaft 15 fixed to a supporting structure 13 (e.g., the roof of a building) in a manner well known in the art. A vertical shaft 14 extends coaxially through tubular shaft 15 and housing 12. Connected to shaft 14 within housing 12, e.g., by welding or the like, are a plurality of rotor or impeller blades 18.

The upper and lower edges of each blade extend radially outward from shaft 14 in parallel planes. The upper edge 101 leads the lower edge 103 by an angle α on the order of 5°-85° in the direction of rotation, and a preferred angle α is approximately 35°. The blade is sharply curved adjacent the upper edge so that a leading or most advanced line 105 (FIGS. 1 and 5) on each blade is slightly below the upper edge 101.

As shown in FIGS. 5 to 8, each blade 18 includes a plurality of aerodynamically or airfoil shaped ribs 107, 109, 111, 113, spaced radially outwardly from the vertical axis of shaft 14. The ribs 107, 109, 111 and 113 are connected along their top to a common support shaft 115 and along their bottom to a common support shaft 117. Shaft 115 and shaft 117 form the angle α when viewed in top plan.

The leading edge 119 of each rib 107, 109, 111 and 113 is curved, while the trailing edge 121 is straight. The straight edges 121 of each rib 107, 109, 111 and 113 approach a vertical plane through the vertical axis of shaft 14 (see FIGS. 6 and 8) as the ribs progress radially inwardly towards shaft 14, while the leading curved edges form the line 105 in advance of the top support shaft 115.

The curved leading edges 119 of the ribs and the top and bottom support shafts are covered by a lightweight skin 123, and if desired, apertures 125 can be provided in each rib to lighten the weight of each rotor blade, to decrease its resistance to a turning torque.

Extending outwardly from a fluid entrance passage 20 into rotor housing 12 at an angle β of approximately 255° is a substantially triangular plate 22. Plate 22 serves to concentrate and guide incoming fluid and to form a venturi to accelerate the fluid at the entrance passage 20 just prior to its impinging upon one of the blades 18 exposed within the quadrant of the entrance passage 20. Plate 22 also serves to bend the incoming fluid in an angular direction to impinge on a second one of the blades 18 which is disposed 90° behind the exposed blade 18.

Extending from the opposite side of the housing 12 are a pair of spaced, vertical vanes or tail structures 30. Vanes 30 may be welded to the exterior surface of housing 12 by horizontal gussets 31 and serve to coaxially turn the housing 12 relative to the rotor blades 18 so that the fluid passage 20 is substantially normal to the direction of fluid flow. Omnidirectional fluid will impinge upon vanes 30 causing them to position fluid entrance passage 20 normal to the direction of fluid flow.

The bottom or base of annular housing 12 is provided with a plurality of fluid exits or passageways 32 between the support arms 11. The top of the annular housing 12 is provided with a substantially semi-spherical dome 34. Dome 34 includes a fluid passageway 36 contiguous to fluid passageway 20. Fluid passageway 36 extends above the horizontal plane of blades 18.

By virtue of the provision of dome 34 and the auxiliary fluid passageway 36, incoming fluid will not only impinge upon the blade 18 positioned across the fluid passageway 20, but the incoming or non-deenergized fluid will be directed by the dome downwardly to impinge simultaneously on all of the rotor blades 18 within housing 12, toward the fluid exit passages 32. The introduction of incoming fluid into all sections within the housing simultaneously serves to flush or expel deenergized fluid from between the blades out of the housing through the fluid exit passages 32.

A substantially semi-cylindrical deflector frame 26 is attached by arms 27 to the support arms 11 of rotor housing 12 so as to extend beneath the bottom of housing 12. The deflector frame 26 blocks ambient fluid from passing directly beneath the fluid exit passages 32, which, in conjunction with the flushing of deenergized fluid from the interior of housing 12, creates a draft or low pressure area for accelerating movement of the blades by drawing more air through entrance passageways 20 and 36 at an increased rate.

Dome 34 will direct the fully energized fluid to impinge simultaneously upon all of the rotor blades, thereby increasing the momentum given to each of the blades and particularly at commencement of rotation, the initial inertia of the rotor blades 18 to movement is overcome very efficiently and quickly. The dome 34 also serves to increase the pressure at the front of each rotor blade.

The novel construction of each rotor blade 18, described heretofore, presents a greater blade surface area to the incoming fluid from all directions towards the exits and act in concert to screw or multiply the force exerted on the deenergized fluid being expelled through exit passages 12 to enhance its removal, enabling fresh energized fluid to be more quickly drawn into the housing 12 to impinge on the blades to maintain and/or increase the momentum imparted to the blades. The airfoil shaped ribs 107, 109, 111 and 113 above the skin 123 also provide a contour for causing the acceleration of the deenergized fluid beneath the blades so as to increase the fluid velocity adjacent the fluid exit passages 32. The curvature between the leading edge 101 and line 105 beneath the edge creates a low pressure zone to aerodynamically pull the blade forward.

Furthermore, the arrangement of the rotor blade ribs relative to each other and the vertical axis of shaft 14 converts the fluid turbine of the present invention from an impulse-type turbine to a combined impulse and axial flow turbine resulting in yet additional power production. An impulse turbine is one in which all available mechanical energy of the flow is converted into kinetic energy at atmospheric pressure before the flow contacts the rotor blades. In an axial flow turbine at least a portion of the energy of the fluid is converted into kinetic energy as the flow moves about the rotor blades. In the turbine 10, the flow not only is caused to impinge directly on and normal to the upper surface of the blade 18 against the skin 123 between the ribs to provide a drag force to push the blade, as in an impulse turbine, but because of the rib configuration of each blade, and particularly the leading line 105 presented by the curvature of the blades which bends the fluid about the blade, the flow tangential to the line 105 on the bottom surface of the blade (or axial flow) in combination with the normal flow on the top surface of the blade provides a resultant force vector of increased magnitude.

The increased flow velocity through the turbine along with the increased magnitude of the force on the blades results in increased power output of the turbine. For example, the fluid turbine of the present invention provides an increased shaft rotation rate on the order of 20 percent and corresponding power increase on the order of 50–60 percent greater than that attained from the apparatus described in my copending application Ser. No. 876,217.

Shaft 14, which is rotated by blades 18 in the path of the impinging fluid flow, can have its free terminal end connected to the windings of an electrical generator or as illustrated in FIGS. 1 and 4, a plurality of blades 37 of a heat brake encased within a housing 38 filled with a fluid medium 40. The fluid medium 40 can be heated by rotation of the blades 37 by virtue of the turbulence and friction generated between the blades 37 and the fluid medium 40, and pumped by the blades 37 from an inlet 42 to an outlet pipe 44 wherein the fluid medium can be placed in heat exchange relation with water or the like in a home plumbing system.

The turbine of the present invention is uniquely suited to drive all pump type loads at peak turbine efficiency for all ambient fluid speeds making it ideal for irrigation, air compression and heat brake, heat producing application.

What is claimed as new is:

1. A fluid turbine, comprising:
a plurality of rotor blades mounted on a shaft for rotation in a reference plane about the longitudinal axis of said shaft when exposed to a source of flowing fluid.
a housing enclosing said plurality of rotor blades therein and having interior sidewalls spaced above said rotor blades and inclined with respect to said reference plane for creating a fluid swirl area in upper regions of said housing,
said housing including a fluid entrance passage therein lying within said reference plane in alignment with said plurality of rotor blades, said housing further including a fluid exit passage therein spaced from said swirl area and beneath said plurality of rotor blades, said fluid exit passage extending essentially coextensive with the area swept by said rotor blades upon rotation of the latter,
each of said rotor blades having an upper and lower edge extending from said shaft radially outward from said longitudinal axis, the upper edge of each of said blades leading the lower edge thereof in the direction of rotation of said blades.

2. A fluid turbine as defined in claim 1, wherein each of said rotor blades is essentially triangular in shape when viewed in plan, perpendicular to said reference plane.

3. A fluid turbine as defined in claim 1, wherein one extremity of the upper and lower edges of each of said rotor blades is connected to said shaft.

4. A fluid turbine as defined in claim 1, including means connected to said housing for rotating said housing about said longitudinal axis independent of the rotation of said rotor blades to position said fluid entrance passage in said housing essentially perpendicular to the direction of flow of fluid from said source thereof.

5. A fluid turbine as defined in claim 1, wherein said interior sidewalls of said housing define a dome shape.

6. A fluid turbine as defined in claim 1, including means mounted on said housing adjacent said fluid exit passage for creating a zone of low fluid pressure adjacent said fluid exit passage.

7. A fluid turbine as defined in claim 1, wherein essentially the entire bottom of said housing is open, said open bottom of said housing defining said fluid exit passage.

8. A fluid turbine as defined in claim 1, wherein said housing encloses greater than 180° of the periphery of the rotational path of said blades.

9. A fluid turbine as defined in claim 1 wherein the upper edge of each of said rotor blades leads the lower edge by an angle on the order of 5°–85° in the direction of rotation.

10. A fluid turbine as defined in claim 9 wherein the upper edge of each of said rotor blades leads the lower edge by an angle on the order of 35° in the direction of rotation.

11. A fluid turbine as defined in claim 9 wherein each of said rotor blades includes a rearwardly-extending curvature adjacent its upper edge such that the leading surface on each said blade is intermediate the upper and lower edges of the blade.

12. A fluid turbine as defined in claim 11 wherein each of said rotor blades includes a plurality of radially spaced aerodynamically shaped ribs, each of said ribs having leading edges and a trailing edge.

13. A fluid turbine as defined in claim 12 wherein each of the leading edges of each of said ribs are curved and the trailing edge is straight.

14. A fluid turbine as defined in claim 13 wherein the straight edges of the ribs in each blade approach a vertical plane through the vertical axis of said shaft as the ribs progress radially inwardly towards said shaft.

15. A turbine blade comprising:
a horizontal, elongate, upper edge support, a horizontal, elongate, lower edge support trailing said upper edge support by an angle on the order of 5°-85° when said supports are viewed in plan, and a plurality of spaced, substantially vertical support or structural ribs between said upper and lower edge supports, each of said ribs having a leading edge and a trailing edge, the leading edge of each of said ribs being curved, there being a straight reference line extending between said upper and lower edge supports at said trailing edge, said reference line associated with each of the ribs approaching a vertical plane normal to the trailing edge as the ribs progress from one end to the other, the distance between said upper and lower edge supports measured along said reference line increasing in magnitude as the ribs progress from one end to the other, and an outer skin covering a portion of said ribs, one set of adjacent ends of said upper and lower support lying generally within said vertical plane and being essentially vertically aligned, the end of the upper support in the opposite set of adjacent ends of said upper and lower supports being spaced from said vertical plane.

16. A turbine in accordance with claim 15 wherein the leading curved edge of each of said ribs extends outwardly beyond the upper edge support intermediate the upper and lower edge supports.

* * * * *